United States Patent

Hyodo et al.

Patent Number: 5,715,239
Date of Patent: Feb. 3, 1998

[54] ATM MULTIPLEX TRANSMISSION SYSTEM HAVING TEST EQUIPMENT

[75] Inventors: Ryuji Hyodo; Tetsuo Nishino; Susumu Eda; Katsumi Oomuro; Kenji Tanaka; Osamu Sekihata; Hiroyuki Hatta; Reiko Furuya, all of Kawasaki, Japan

[73] Assignee: Fujitsu Limited, Kanagawa, Japan

[21] Appl. No.: 604,368

[22] Filed: Feb. 21, 1996

Related U.S. Application Data

[63] Continuation of Ser. No. 925,596, Aug. 4, 1992, abandoned.

[30] Foreign Application Priority Data

Aug. 5, 1991 [JP] Japan ..................... 3-194615

[51] Int. Cl.[6] ........................................ H04J 3/14
[52] U.S. Cl. ................................................. 370/248
[58] Field of Search ........................ 370/94.1, 94.2, 370/60, 13, 16, 61, 14, 241, 244, 248, 250, 251, 242; 379/16; 371/20.1

[56] References Cited

U.S. PATENT DOCUMENTS

| | | | |
|---|---|---|---|
| 4,694,453 | 9/1987 | Kobayashi et al. | 370/13 |
| 4,858,224 | 8/1989 | Nakano et al. | 370/16 |
| 4,989,202 | 1/1991 | Soto et al. | 370/13 |
| 4,996,695 | 2/1991 | Dack et al. | 370/13 |
| 5,153,874 | 10/1992 | Kohno | 370/13 |
| 5,157,654 | 10/1992 | Sisneros | 370/60 |
| 5,197,062 | 3/1993 | Picklesimer | 370/13 |
| 5,251,204 | 10/1993 | Izawa et al. | 370/13 |

*Primary Examiner*—Douglas W. Olms
*Assistant Examiner*—Ajit Patel
*Attorney, Agent, or Firm*—Helfgott & Karas, P.C.

[57] ABSTRACT

An ATM multiplex transmission system including AAL processing units, an ATM cross connection processing unit, and a plurality of lines connected to the same, wherein the system has test equipment formed in it, the test equipment being formed as a particular cell generating unit and a routing information setting unit in at least one of the line corresponding points which the ATM cross connection processing unit has at the portions connecting with the lines. When a routing test is performed in the system, the VPI and the VCI designating the route are given from the outside as the routing information.

14 Claims, 15 Drawing Sheets

ATM MULTIPLEX TRANSMISSION SYSTEM HAVING TEST EQUIPMENT

This is a continuation of application Ser. No. 07/925,596, filed Aug. 4, 1992 now abandoned.

BACKGROUND OF THE INVENTION

The present invention relates to an asynchronous transfer mode (ATM) multiplex transmission system having test equipment.

In recent years, the ATM system has been viewed as a promising communication system compatible with broadband integrated service digital networks (B-ISDN). In an ATM communication network, data is transmitted in units of fixed lengths (53 octets) called "cells". There are several media of the data transmitted, from low speed media like digital audio signals to high speed ones like computer data and video data. These are all transmitted on the same network.

An ATM multiplex transmission system has the function of receiving digital signals generated from the large number of terminal equipment in the ATM network, converting them into cells, multiplexing the same, and distributing the cells to the target lines by ATM cross connection. Such an ATM multiplex transmission system is provided with processing units which assemble cells in accordance with the various types of media (audio, video, and data) and protocols. Processing is performed so that signals obtained by multiplexing the thus assembled cells are distributed to lines leading to the desired other parties by an ATM cross connection unit.

When such an ATM multiplex transmission system is started up or when it is subjected to periodic maintenance etc., it is necessary to test the operation of the system.

Description of the Related Art

Test methods and equipment have already been established for the conventional synchronous transfer mode (STM) multiplex transmission system.

However, there is the problem that it is not possible to use the test methods and equipment established for the conventional STM multiplex transmission system as they are for an ATM multiplex transmission system. The reason why is that the method of processing the transmitted data in the STM multiplex transmission system and the method of processing the transmitted data in the ATM multiplex transmission system are completely different.

SUMMARY OF THE INVENTION

Therefore, the object of the present invention is to enable realization of the same tests as generally performed in an STM multiplex transmission system in an ATM multiplex transmission system as well by interposition of test equipment constructed by simple hardware.

To attain the above object, the present invention takes note of the number of line corresponding points provided corresponding to each of the lines by a main constituent element of the ATM multiplex transmission system, that is, the ATM cross connection processing unit. A means for generating a particular cell and a means for setting routing information are formed at at least one of the line corresponding points. The particular cell output from the particular cell generating means runs along the route designated by the routing information setting means. This particular cell runs in the system for the routing test.

BRIEF DESCRIPTION OF THE DRAWINGS

The above object end features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the problems therein will be first described with reference to the related figures.

Figure 1:
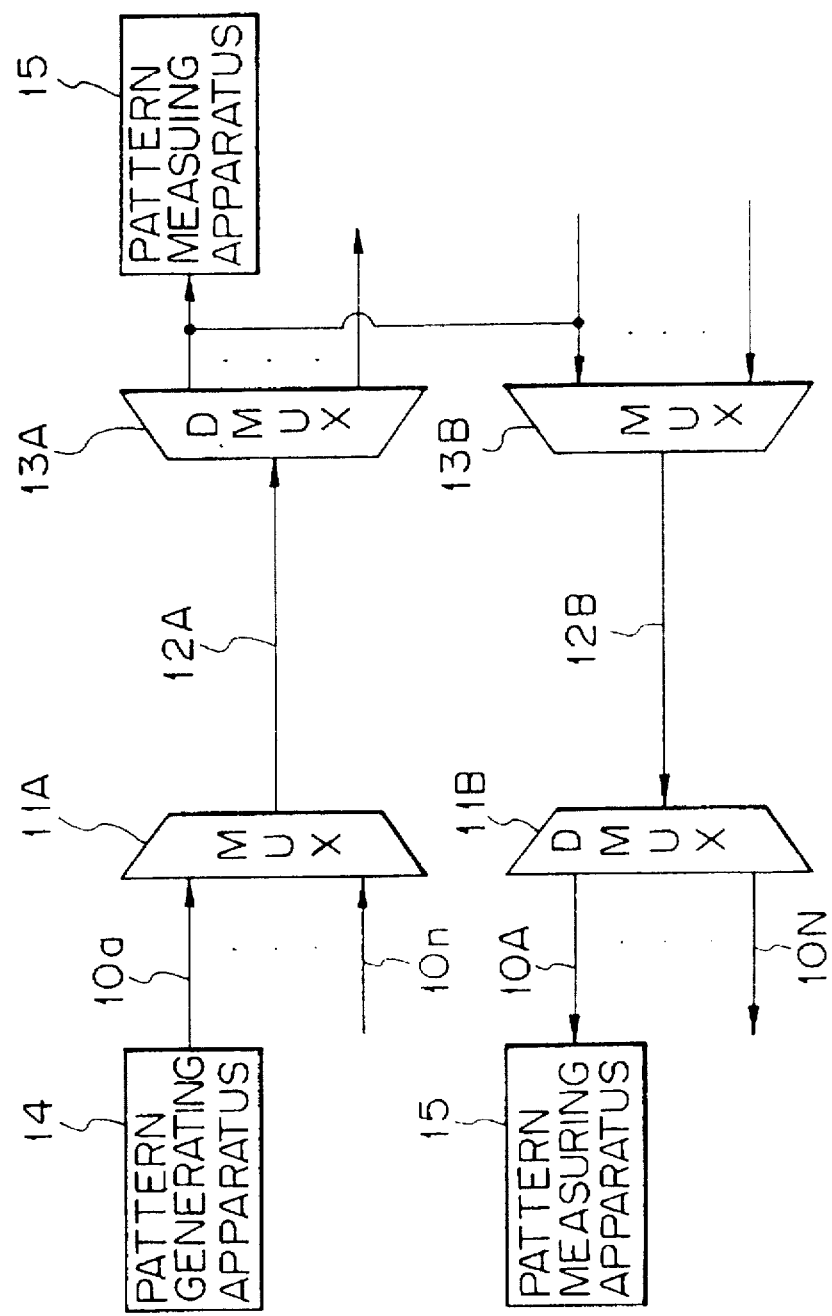
FIG. 1 is a view of a conventional STM multiplex transmission system and test equipment for the same.

FIG. 1 is a view of a conventional STM multiplex. transmission system and test equipment for the same.

In the conventional STM multiplex/demultiplex transmission system of FIG. 1, digital signals input to a plurality of incoming lines 10a to 10n are compressed in time (increased in speed) and multiplexed at a multiplex unit (MUX) 11A. At this time, the signals of the incoming lines 10a to 10n are allocated prefixed time slots and multiplexed there. The multiplexed signals are supplied through the line 12A to a demultiplex unit (DMUX) 13A and are distributed to lines corresponding to the predetermined destinations of the time slots. The compressed signals are then restored to their original time lengths. A downstream line construction is provided with respect to the above-mentioned upstream lines. The signals of the plurality of lines incoming to the multiplex unit (MUX) 13B are multiplexed, are input through the multiplex line 12B to the demultiplex unit 11B, and then are distributed to the downstream lines 10A to 10N.

The upstream lines 10a to 10n and the downstream lines 10A to 10N have a paired relationship. For example, 10a and 10A correspond to the transmission line and reception line of the same digital apparatus, for example, telephone terminal.

When performing a signal flow and connection test on the lines (time slots or channels) in the above-mentioned STM multiplex transmission system, as shown in FIG. 1, a pattern generating apparatus 14 which generates a pseudo noise (PN) pattern, for example, a most length (M) pattern, is connected to the incoming line being tested to input the signals of the pattern, and a pattern measuring apparatus 15 is connected to the outgoing line of the demultiplex unit 11B, determined in advance so that the signals of the incoming line are output to to determine if the predetermined pattern can be detected as is. In this case, it is also possible to detect the error rate etc. Further, the outgoing line of the demultiplex unit 13A is connected by loopback to the downstream side line, a pattern measuring apparatus 15 is connected to the corresponding line of the downstream side demultiplex unit 11B, and the loopback pattern is checked in another test. This enables a signal flow and connection test of both the upstream and downstream lines to be performed.

As mentioned above, it is believed that ATM communication networks will spread widely instead of STM communication networks in the future. At the present time, however, sufficient research has yet to be performed on the practical test equipment for ATM multiplex transmission systems formed in such ATM communication networks.

When trying to realize test equipment for an ATM multiplex transmission system, one would first think of applying the test equipment used for conventional STM multiplex transmission systems, but such application would be difficult, as mentioned earlier. This is because an ATM multiplex transmission system employs a completely different structure from the STM multiplex transmission system shown in FIG. 1.

Figure 2:
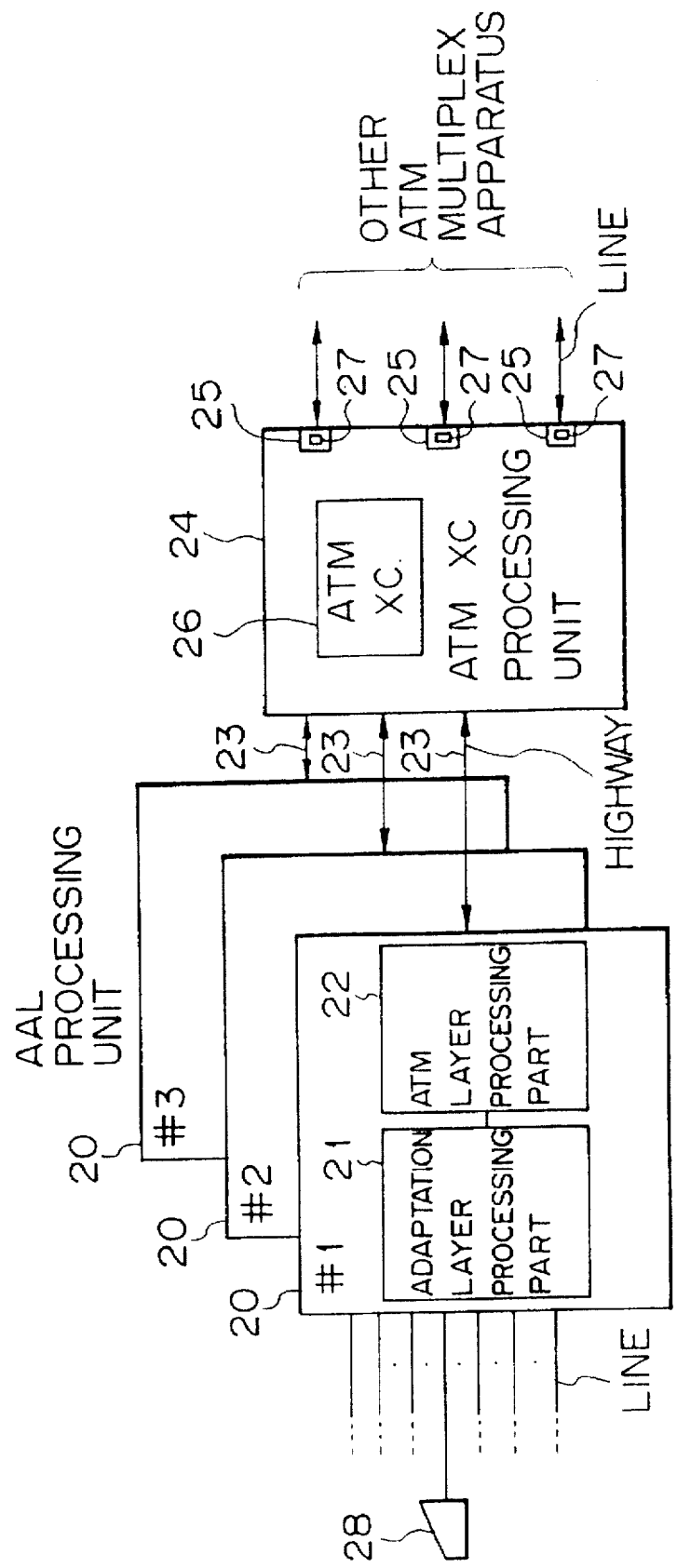
FIG. 2 is a view of a known ATM multiplex transmission system.
Figure 3A:
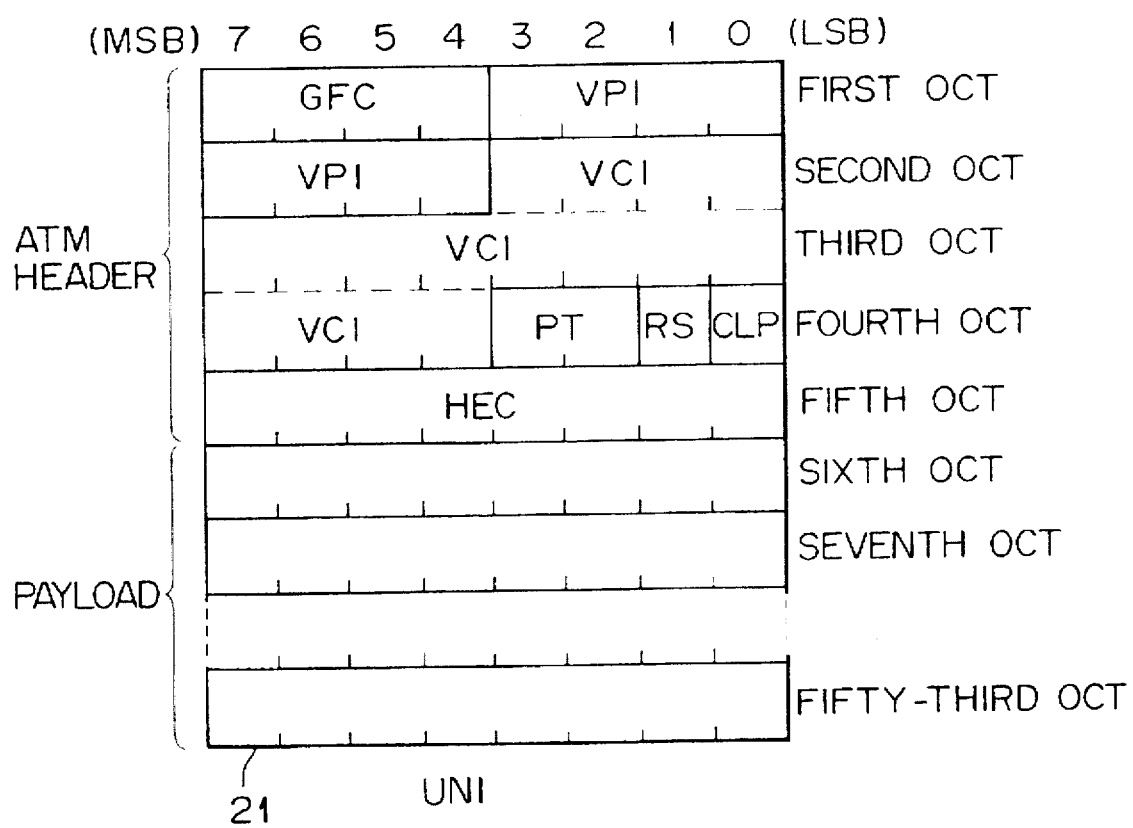
FIG. 3A is a view of an ATM cell format for UNI recommended by the CCITT.

FIG. 2 is a view of a known ATM multiplex transmission system. FIG. 3A is a view of an ATM cell format for a user-network interface (UNI) recommended by the CCITT, and FIG. 3B is a view of an ATM cell format for a network-node interface (NNI) recommended by the CCITT.

Figure 3B:
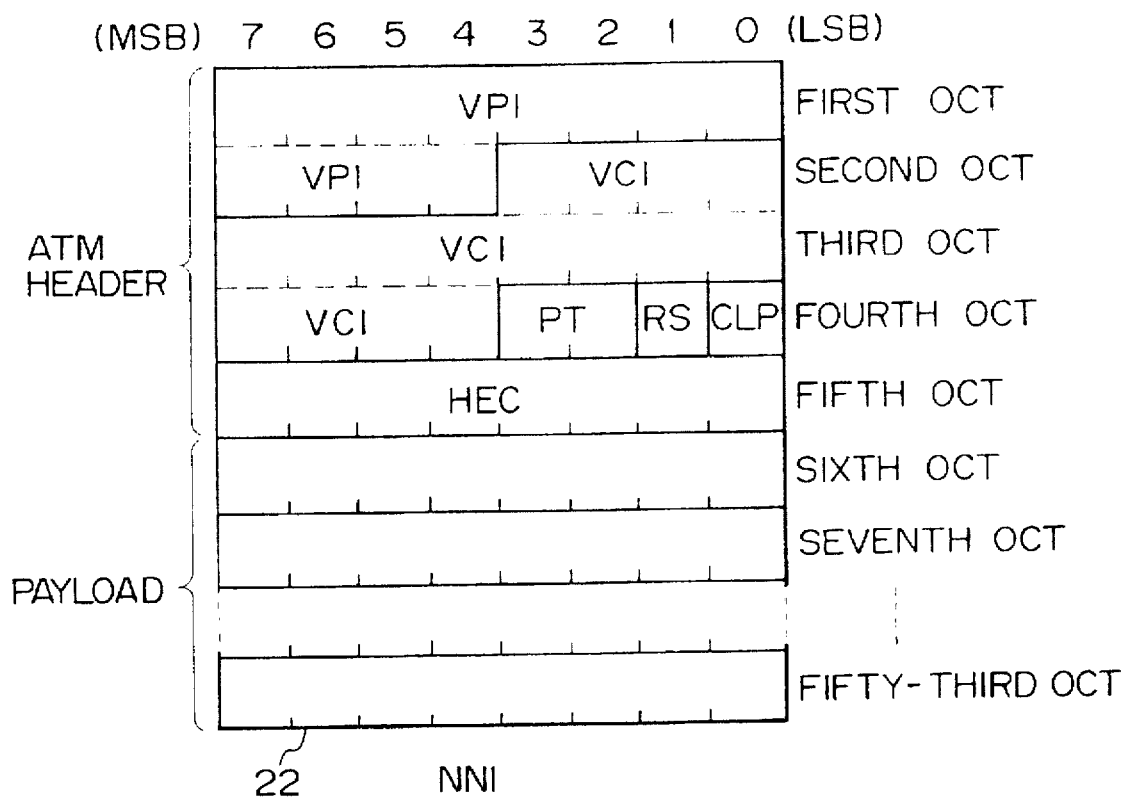
FIG. 3B is a view of an ATM cell format for NNI recommended by the CCITT.

The formats of FIG. 3A and FIG. 3B are the same in all portions except for the point that the 4 bits (7 to 4 bit positions) of the start of the first octet (8 bits indicated by "OCT") are for generic flow control (GFC) in the case of a UNI and are for a virtual path identifier (VPI) in the *case of an NNI.

That is, the 4 bits of the latter half (3 to 0 bit positions) of the first octet and the 4 bits of the start of the second octet form the VPI. After this, a virtual channel identifier (VCI) is provided up to the 4 bits of the first half of the fourth octet. The pilot type (PT), reserve bit (RS), and the cell loss priority (CLP) follow. The fifth octet is provided with header error control information (HEC). The ATM header is comprised by the first to fifth octets. The 48 octets from the succeeding sixth octet to the fifty-third octet constitute the payload.

In FIG. 2, reference numeral 20 shows adaptation ATM layer (AAL) processing units which each include an adaptation (ADP) layer processing part 21 having the function of terminating the protocol with the terminal equipment 28 and assembling (constructing cell units) and disassembling (restoring cells into original data) cells of an adaptation layer and also an ATM layer processing part 22 which is provided with the function of adding headers to the cells from the adaptation layer processing part 21 or receiving cells from an ATM cross connection (indicated by ATM-XC) processing unit 24 and removing the headers from the same. Reference numerals 23 show highways (actually two each being provided for the upstream and downstream directions) connecting the AAL processing units 20 and the next ATM cross connection processing unit 24. The ATM cross connection processing unit 24 includes the ATM cross connection 26.

The AAL processing units 20 each accommodate lines connecting to a plurality of terminal equipment 28. Digital signals from the lines and in an upstream direction (direction heading from terminal equipment to ATM multiplex transmission system) are separated into units of predetermined lengths of digital data at the adaptation layer processing parts 21 of the AAL processing units 20 and used as data fields. Adaptation headers (for example, 3 bytes) are added to assemble 48 byte cells (pilot portions).

The cells output from the adaptation layer processing parts 21 have headers (5 bytes) added to them at the next ATM layer processing parts 22 to prepare ATM cells (total 53 bytes), which are multiplexed and output to the highways 23. The ATM cross connection processing unit 24 distributes the cells multiplexed on the highways connected with the AAL processing units 20 to lines heading to the destinations corresponding to the VPI/VCI's. A plurality of cells are multiplexed (time compressed) on the lines.

Each of the lines is provided with a line corresponding point 25. The line corresponding points of other ATM multiplex transmission systems (not shown) are connected through the lines. The line corresponding points 25 generate empty cells so as not to cause a loss of synchronization at the other sides connected to the lines when cells sent on the lines do not arrive continuously and are provided with empty cell generating units 27 for that purpose. The empty cells are constructed with a VPI=0..0 and VCI=0..0 and the pilots are ignored.

The ATM cross connection processing unit 24 performs the processing for the downstream direction signals as well, outputs the ATM cells input from the lines to the downstream highways 23, and inputs them to the AAL processing units 20 processing the downstream signals. The ATM layer processing parts 22 in the processing units 20 discriminate the headers of the cells and remove the headers from them. At the next adaptation layer processing parts 21, the cells are disassembled and the original digital signals are restored.

A plurality of the AAL processing units 20 are provided in accordance with the number of the terminal equipment accommodated and the type of protocol. A plurality of lines with the same protocol are accommodated and multiplex processing performed. Therefore, the AAL processing units 20 are provided separately as shown in FIG. 2, for example, with #1 for the audio signal lines, #2 for the lines for the basic (BSC) protocol of the data signals, #3 for the lines for the high level data link control (HDLC) of the data signals, #4 for the lines for the video signals, etc.

When testing the signal flow and connection, the error rate, etc. of the above-mentioned ATM multiplex transmission system, first the protocol is terminated and then the data is sent in the ATM cells of the construction shown in FIG. 3A and 3B, so there were cases where it was difficult to perform the tests using a pattern generating apparatus in the same way as the related art (FIG. 1).

In general, only significant information is transmitted on a data terminal transmission path (logical channel) of an ATM multiplex transmission system. For example, explaining this by the line of the HDLC protocol, with HDLC, flags (F) comprised by "01111110" are disposed before and after the frames. Between them, data is transmitted by frames containing the address (A), control (C), data, and frame check sequence (FCS). When there is no data, the result is a time file, so a pattern of continuous flags (F) is sent. In this case, since a continuous pattern of flags (F) is nonsignificant information, to send only the significant information, in general, the AAL processing unit for the lines connected to terminal equipment for the HDLC protocol is provided with a function whereby the data is detected by the flags, just the significant data (frames) is converted into cells and transmitted, and the portion of information not significant as information, such as the tame files (continuous flags), are suppressed and not transmitted.

Therefore, it is not possible to test the signal flow and connection, the error rate, etc. of a transmission path including AAL processing units 20 and an ATM cross connection processing unit 24 of an ATM multiplex transmission system in the same way as with the conventional STM multiplex transmission system (see FIG. 1) merely by connecting a pattern generating apparatus 14 to the input side.

The present invention makes it possible to realize tests of the transmission path of a system provided with a function of converting only significant data into cells using a conventional pattern generating apparatus and makes it possible to test the signal flow and connection function, the error rate, etc. of an ATM cross connection.

Figure 4:
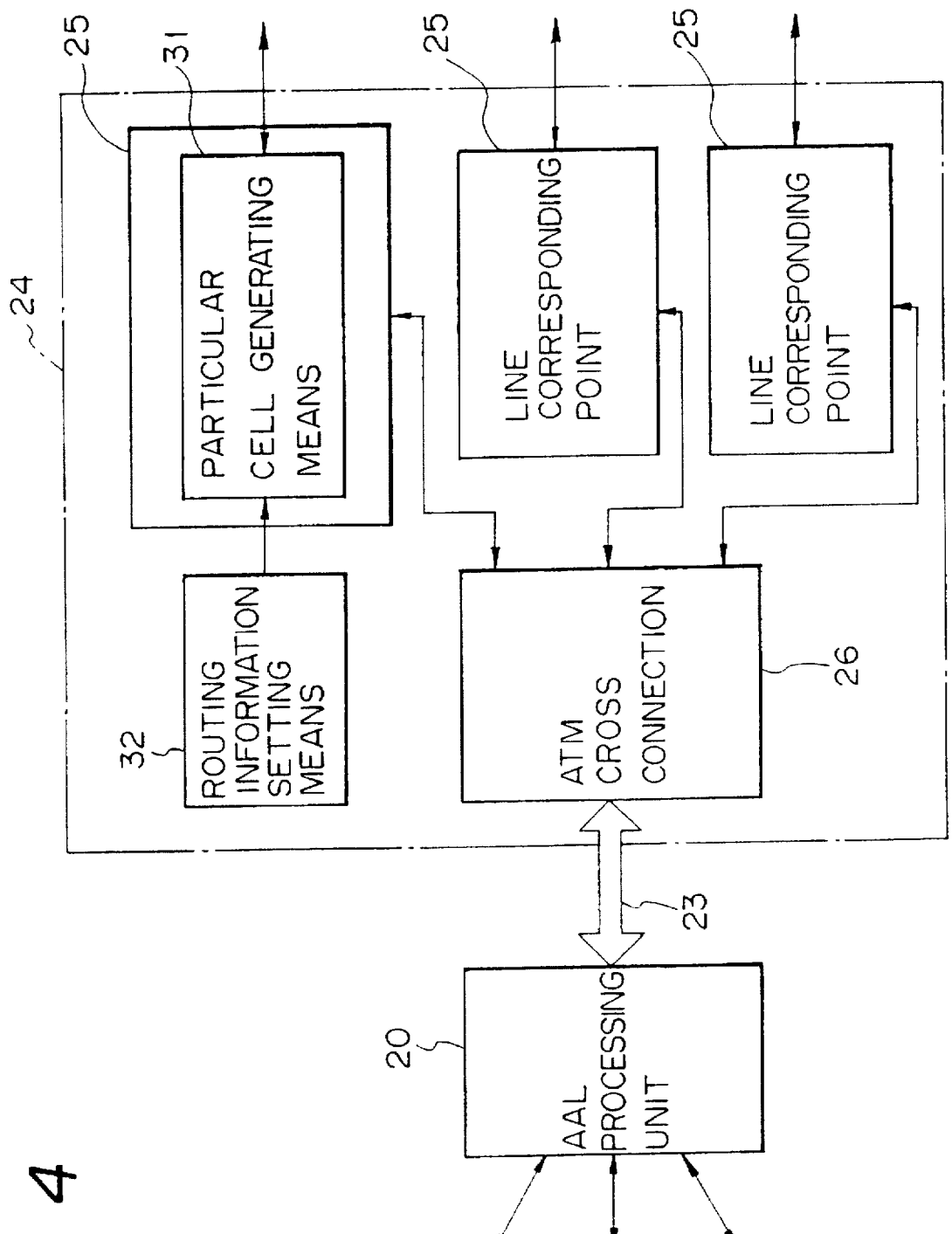
FIG. 4 is a schematic view of the principle and constitution of the present invention.

FIG. 4 is a schematic view of the principle and constitution of the present invention. As shown in the figure, the ATM multiplex transmission system having test equipment according to the present invention comprises AAL processing units 20 which terminate the protocol with terminal equipment 28, assemble the data to be transmitted as ATM cells, and multiplex them or demultiplex the multiplexed ATM cells transmitted to the terminal equipment and distribute them to the terminal equipment 28; an ATM cross connection processing unit 24 which switches the multiplexed ATM cells from the AAL processing units 20 to designated lines or demultiplexes the multiplexed ATM cells from the lines and inputs them to the AAL processing units 20 and has a plurality of line corresponding points 25 provided corresponding to each of the lines; a means 31 for generating a particular cell, which is formed at least at one of the plurality of line corresponding points 25; and a routing information setting means 32 which works with the specific cell generating means 31 to write routing information for designating a transmission route of the particular cell in the header of the particular cell.

Figure 5:
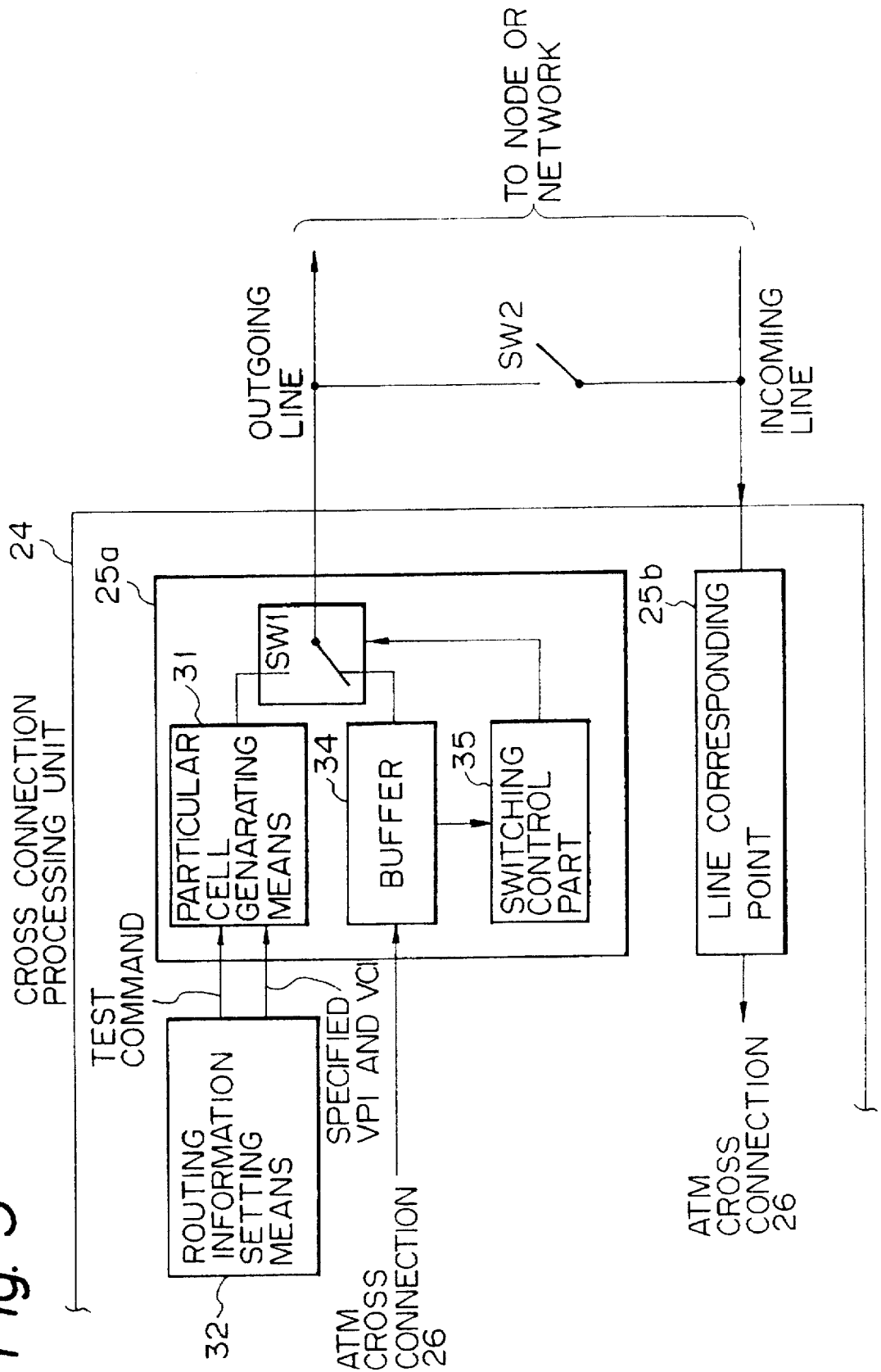
FIG. 5 is a view of an embodiment of the present invention.

FIG. 5 is a view of an embodiment of the present invention. In the figure, SW1 is a selection switch, SW2 is a loopback switch, 25a is an outgoing line-side line corresponding point, 25b is an incoming line-side line corresponding point, 34 is a buffer, and 35 is a switching control part. The other constituent elements have already been explained with reference to FIG. 2 and FIG. 4.

The routing information setting means 32 gives the routing information to the particular cell generating means 31 together with a test command. The routing information preferably is written as a VPI and VCI in the header of the ATM cell comprising the particular cell.

The particular cell generating means 31 may also serve as a general empty cell generating unit 27 (FIG. 2). That is, in the ordinary transmission state other than at the time of execution of a test, the routing information is disabled and the VPI and the VCI are both made "0", whereby the particular cell generating means 31 may be made to function de facto as an existing empty cell generating unit.

The outgoing lane connected to a test-use line corresponding point including the particular cell generating means 31 and the routing information setting means 32, in the plurality of line corresponding points, is connected to another incoming line of the ATM cross connection processing unit 24 for performing the routing test. This may be done through the loopback switch SW2.

The test-use line corresponding point 25a including the particular cell generating means 31 and the routing information setting means 32 has a buffer 34 which successively and temporarily stores normal ATM cells output from an ATM cross connection 26 in the ATM cross connection processing unit 24; a selection switch SW1 which selects one of the output cell from the buffer 34 or the particular cell from the particular cell generating means 31; and a switching control part 35 which monitors if the buffer 34 has become empty and which, if detecting that it has become empty, switches the selection switch SW1 to the particular cell generating means 31 side and transmits the output cell from the particular cell generating means 31 to the outgoing line connected to the test-use line corresponding point 25a.

Therefore, the buffer 34 receives as input the ATM cells which are distributed and multiplexed at the ATM cross connection 26. These are then successively read out and sent to the outgoing line.

When the buffer 34 becomes empty, the switching control part 35 detects this state and switches the selection switch SW1 to output the cell prepared in the particular cell generating means 31 to the outgoing line. The output cell is looped back at the incoming line side and input from the line corresponding point 25b if the loopback switch SW2 is closed in advance. This input cell is input from the line corresponding point 25b to the ATM cross connection 26. The route is changed in accordance with the designated VPI/VCI. The cell output from the particular cell generating means 31 is sent along a designated route in this way.

If the cell output from the particular cell generating means 31 is input to another ATM multiplex transmission system through the outgoing line, then it is possible to test the transmission path in the other system.

Figure 6:
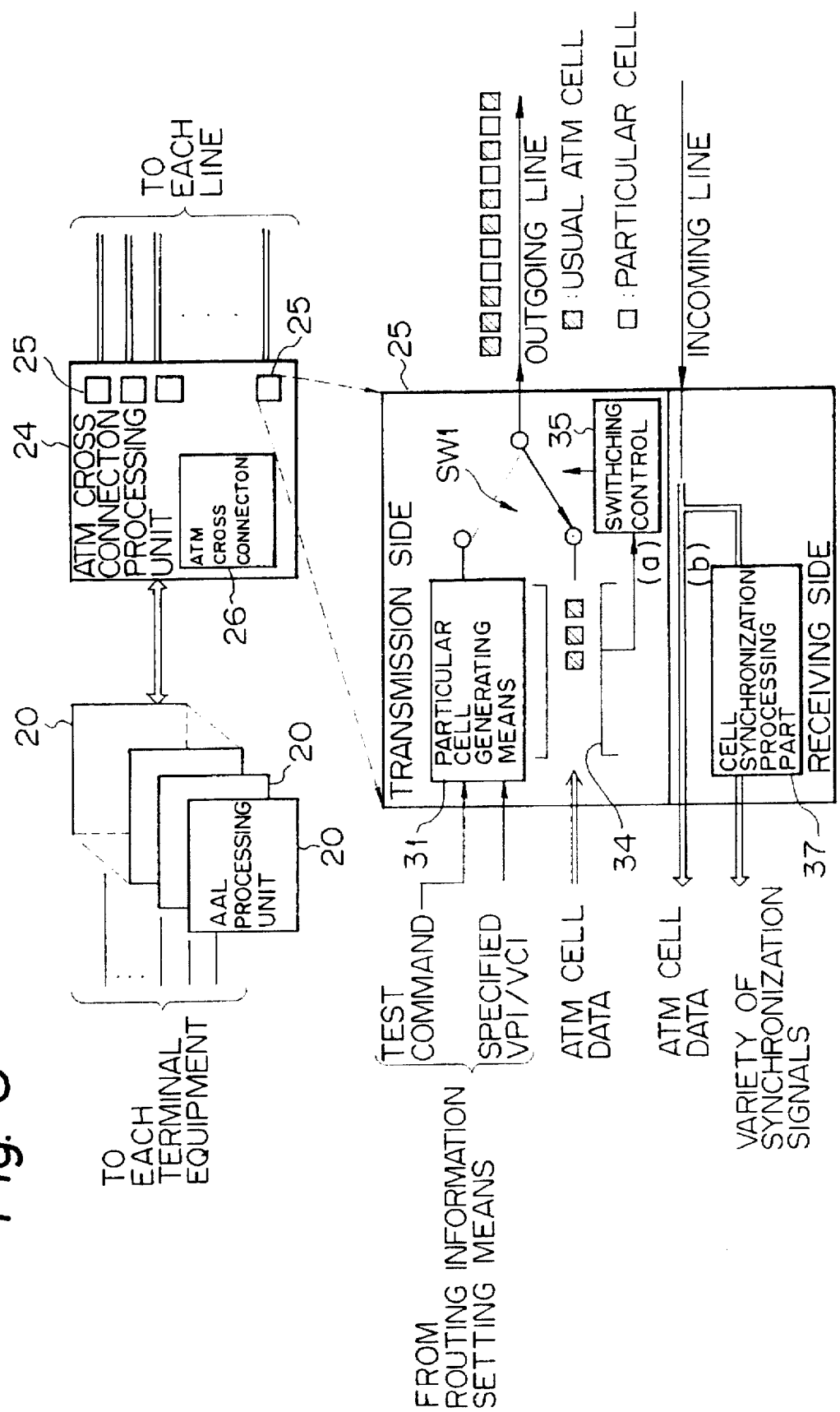
FIG. 6 is a view for explaining in more detail the constitution of a line corresponding point.

FIG. 6 is a view for explaining in more detail constitution of a lane corresponding point.

The figure shows at the bottom in an enlarged state the internal construction of a line corresponding point provided at an ATM cross connection processing unit 24 in an ATM multiplex transmission system comprised of AAL processing units 20 and an ATM cross connection processing unit 24. Note that the line corresponding points 25 of the ATM cross connection processing unit 24 are connected to other ATM multiplex transmission systems (or nodes), not shown, by the lines and transfer ATM cells with the same.

That is, each of the line corresponding points 25 is divided into a transmission side (a) and a reception side (b) and is provided at the transmission side with a particular cell generating means 31, a buffer 34 (constructed by a first-in first-out memory (FIFO)), a switching control part 35, and a selection switch SW1 and at the reception side with a cell synchronization processing part which detects cells transmitted from other ATM multiplex transmission systems and generates synchronization signals.

The particular cell generating means 31 issues an empty cell (where VPI/VCI are each all "0") in the same way as in the past at normal times when no test command is input, but when a test command is input from the routing information setting means 32, variable VPI and VCI can be set. In the case of a test command, the other portions of the particular cell, that is, the other portions of the header (PT, RS, CLP, HEC of FIG. 3A and FIG. 3B) and the pilot value can be freely set together with the test command. At this time, the values of the VPI/VCI are determined by selecting the values corresponding to the transmission path (logical channel) to be tested.

If the cell data (usual data) is input from the AAL cross connection 26 to the line corresponding point 25a, it is once stored in the buffer 34 and then read out to the outgoing line. When the cell data in the buffer 34 runs out, the switching control part 35 detects that empty state and switches the selection switch SW1 to send the output of the particular cell generating means 31 to the line. By this, the test-use particular cell is output instead of the ATM cells including the usual data.

The cell synchronization processing unit 37 is an HEC synchronization circuit and generates various types of synchronization signals including, first of all, signals indicating the timing of the start of the cells, signals indicating the timing of the start of the VPI's, and signals indicating the timing of the start of the VCI's. In the later ATM cross connection 26, the VPI's and VCI's are used for switching the cells, so it is necessary to individually extract the VPI's and VCI's. The above-mentioned timing signals are required for this.

Figure 7A:
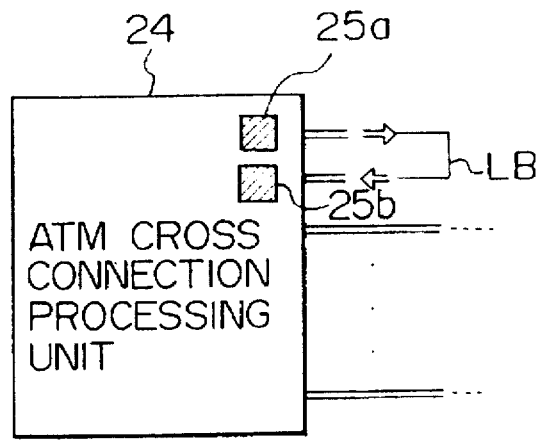
FIG. 7A is a view of a first test mode.
Figure 7B:
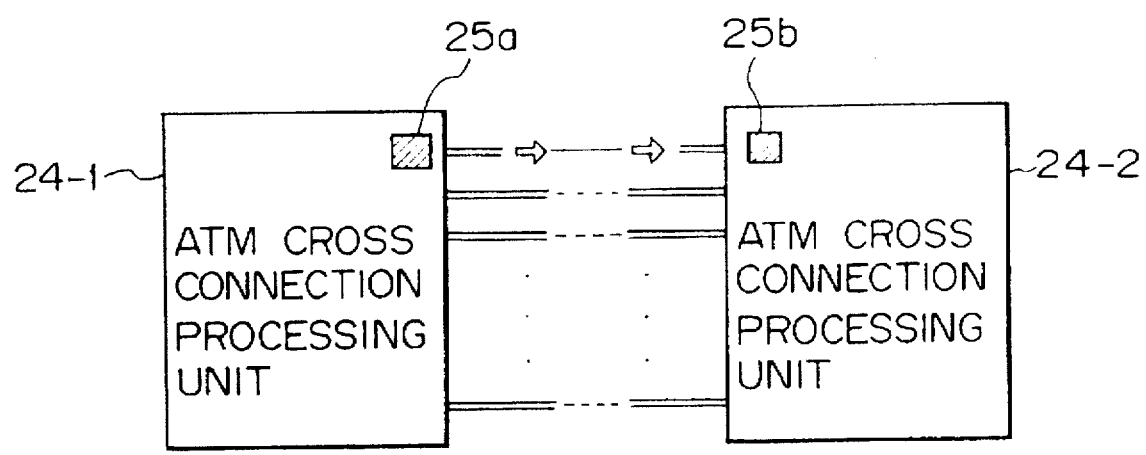
FIG. 7B is a view of a second test mode.

FIG. 7A is a view of a first test mode, and FIG. 7B is a view of a second test mode. In the first test mode shown in FIG. 7A, self-diagnosis is performed by the loopback LB. That is, the outgoing line connected to the test-use line corresponding point including the particular cell generating means 31 and the routing information setting means 32, in the plurality of line corresponding point 25a, is connected to another incoming line of the ATM cross connection processing unit 24 for performing the routing test.

Namely, the output of the outgoing line of the line corresponding point 25a of the ATM cross connection processing unit 24 is connected to the incoming line of the lane corresponding point 25b. At this time, by setting in the particular cell generating means 31 of the line corresponding point 25a the value of the VPI/VCI corresponding to the transmission path of the ATM cross connection 26 desired to be tested, the particular cell input from the line corresponding point 25b is received at the transmission path and diagnosed.

In the second test mode shown in FIG. 7B, diagnosis is performed on the adjoining node. That is, the outgoing line connected to the test-use line corresponding point 25a including the particular cell generating means 31 and the routing information setting means 32, in the plurality of line corresponding points 25a, is connected to the incoming lane of one line corresponding point 25a in another ATM cross connection processing unit 24-2 adjoining the ATM cross connection processing unit 24-1 and the routing test is performed in the other ATM cross connection processing unit 24-2.

Namely, a particular cell having the designated VPI/VCI is transmitted from the ATM cross connection processing unit 24-1 of one ATM multiplex transmission system to the ATM cross connection processing unit 24-2 of the adjoining ATM multiplex transmission system connected by a line. By detecting the particular cell with the designated VPI/VCI at the adjoining ATM cross connection processing unit 24-2, it is possible to test the routing in the ATM cross connection processing unit 24-2.

In both of the test modes of FIG. 7A and FIG. 7B, it becomes possible to test various types of transmission paths by selecting the VPI/VCI set (written) in the particular cell.

In both the test modes of FIG. 7A and FIG. 7B, a means of judgement for confirming that the particular cell having the designated VPI/VCI correctly passes along the transmission path designated by the VPI/VCI is required.

According to a preferable embodiment of the present invention, in the case of either of the first and second text modes, whether the particular cell is correctly distributed in accordance with the routing information is judged using a traffic monitor and control unit, an existing constituent element in the ATM cross connection processing unit 24, 24-2.

Figure 8:
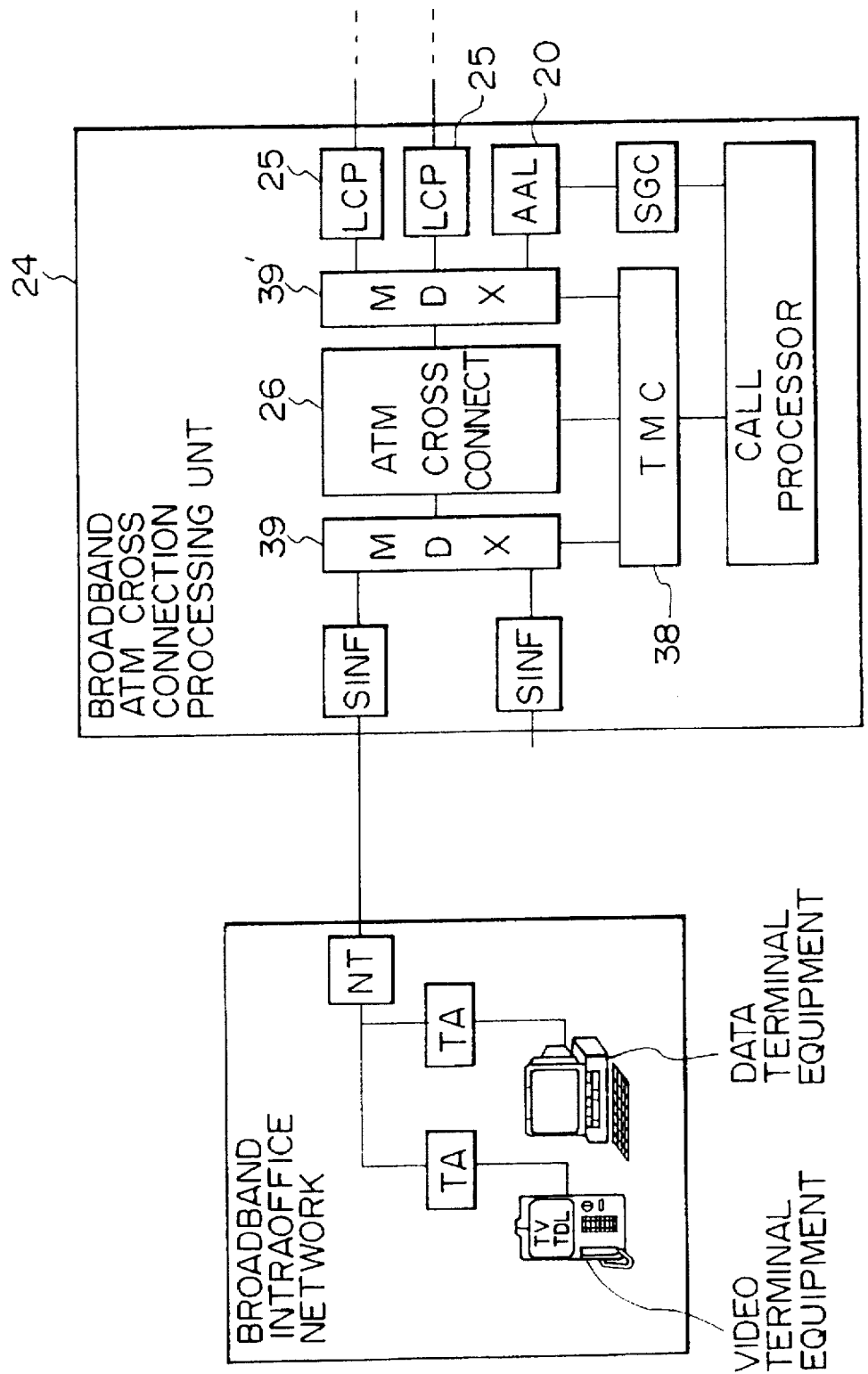
FIG. 8 is a view of an example of a location in an apparatus of a known traffic monitor and control unit.

FIG. 8 is a view of an example of a location in an apparatus of a known traffic monitor and control unit. In the figure, the above-mentioned traffic monitor and control unit (TMC) is shown by reference numeral 38. The TMC 38 cooperates with the ATM cross connection 26 and a pair of multiplex/demultiplexers (MDX) 39, 39' under the management of a call processor 38a to monitor the cell train passing through the same. Further, when traffic is congested, control is performed so as to discard cells with low cell loss priorities (CLP). Further, the TMC 38 calculates the average transmission rate and prepares statistical information.

Therefore, the TMC 38 basically is provided with the function of monitoring if a cell is present on a predetermined route. By using this function, it is possible to detect the presence of a particular cell and therefore execute a test. The results of the detection of a particular cell by the TMC 39 may be directly fetched to the outside and displayed or may be transmitted through the call processor to a predetermined node and displayed on a console at that node.

In FIG. 8, the line corresponding points (LCP) 25 are formed as optical relay interfaces. SINF denotes a subscriber optical interface, SGC a signaling control part, NT a network termination, and TA a terminal adapter.

Figure 9:
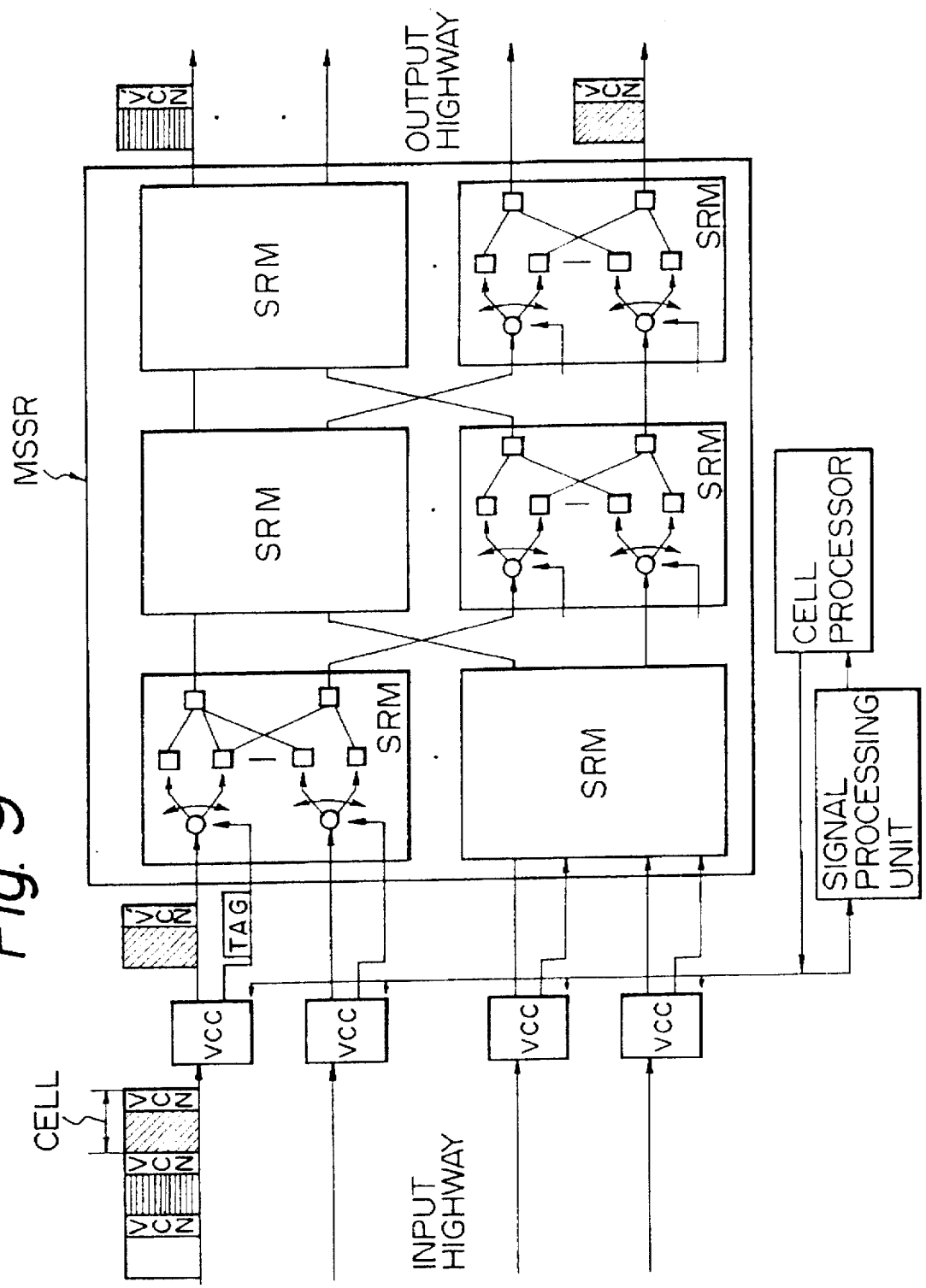
FIG. 9 is a view of a known example of an ATM cross connection unit.

FIG. 9 is a view of a known example of an ATM cross connection unit and shows an ATM Cross connection of the multistage structure self-routing module (MSSR) type where a plurality of self-routing modules (SRM'S) are connected in tandem.

Cells input from the input highways each have a virtual channel number (VCN), which VCN is converted to a VCN' by a VCN converter (VCC). At this time, the VCC generates a tag, gives this to the SRM element, and sets a path selectively. Note that the VCN is determined by the previously mentioned VPI/VCI. In the example of this figure, the cells coming in from the top left are sent out to the output highway located at the bottom right.

The VCC's give the VCN information to the call processor through a signal processing unit, while the call processor causes a corresponding VCN' and tag to be output from the VCC's.

Figure 10:
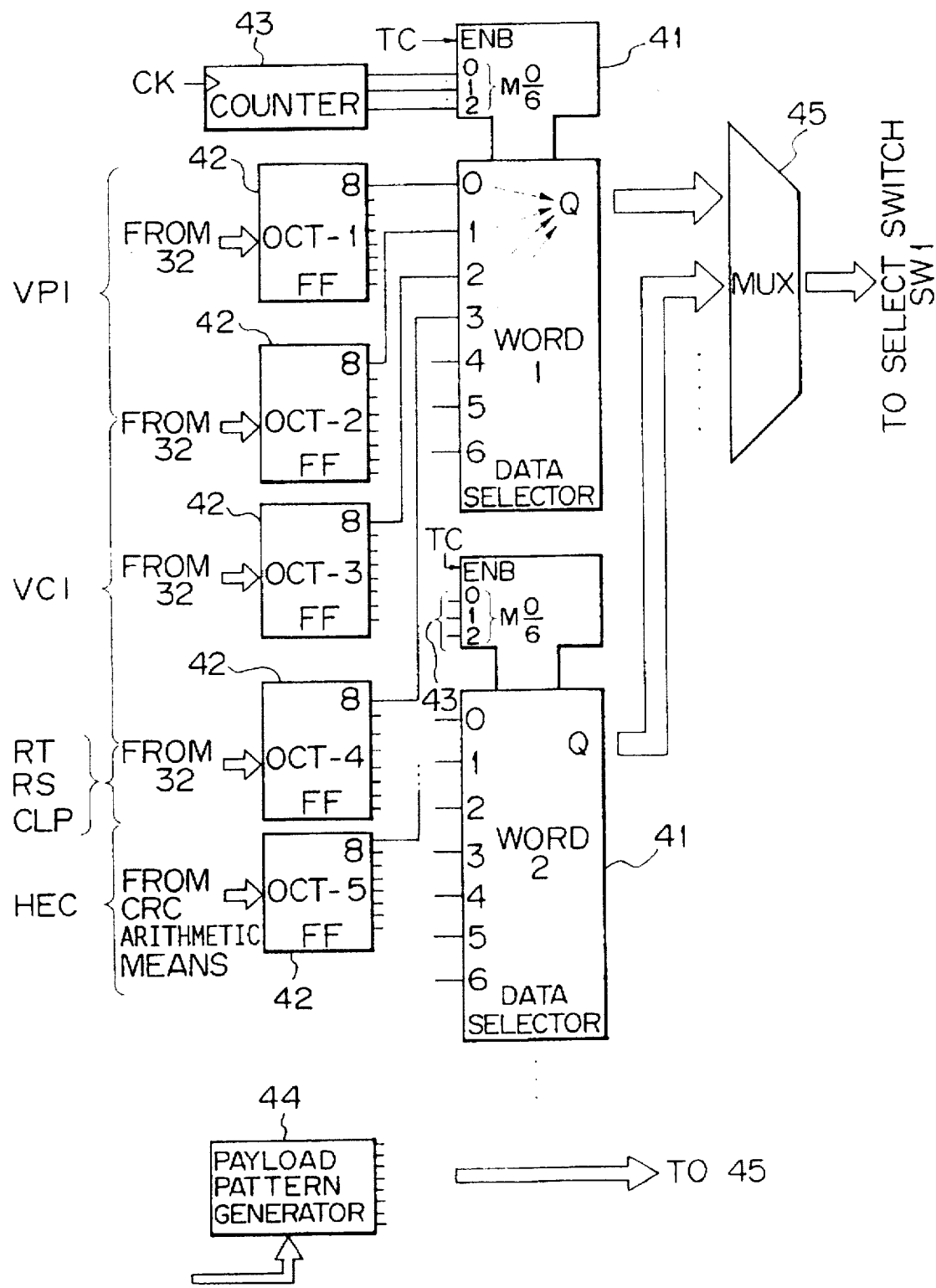
FIG. 10 is a circuit diagram of a more detailed example of a means for generating a particular cell.

FIG. 10 is a circuit diagram of a more detailed example of a means for generating a particular cell. As shown in the figure, the particular cell generating means 31 is comprised of flip-flops 42 corresponding to a plurality of octets comprising the ATM header portions of the ATM cells; data selectors 41 which select the bits of the octets and output the word data; counters 43 which select the bit data in the data selectors 41 in the order of the octets; and a multiprocessor (MUX) 45 which combines the outputs from the data selectors 41, the flip-flops 42 including at least a plurality of flip-flops for holding the externally designated VPI's and VCI's for a while. If the construction of this figure is for an NNI, the VPI occupies the 8 bits of the flip-flip (OCT-1) and 4 bits of the most significant bit (MSB) side of the flip-flip (OCT-2), for a total of 12 bits, while VCI occupies the 4 bits of the least significant bit (LSB) side of the flip-flop (OCT-2), the 8 bits of the flip-flop (OCT-3), and 4 bits of flip-flop (OCT-4), for a total of 16 bits.

Reference numeral 44 is a payload pattern generating apparatus which produces the pattern required for the test. Alternatively, an all "0" pattern may be used.

The HEC information in the ATM cells may be synchronized at the reception side. This applies to the particular cell of the present invention as well. It is also necessary to prepare an HEC for the particular cell.

For this, as one of the flip-flops, a header HEC flip-flop (OCT-5) 42 which holds the HEC information for a while is included. The HEC flip-flop 42 connects to a calculation means, which calculation means calculates in advance the HEC bits when the VPI's and VCI's are determined and supplies the results of its calculations to the HEC flip-flop 42. The calculation means referred to here is, for example, a CRC arithmetic means such as described in the figure.

Figure 11:
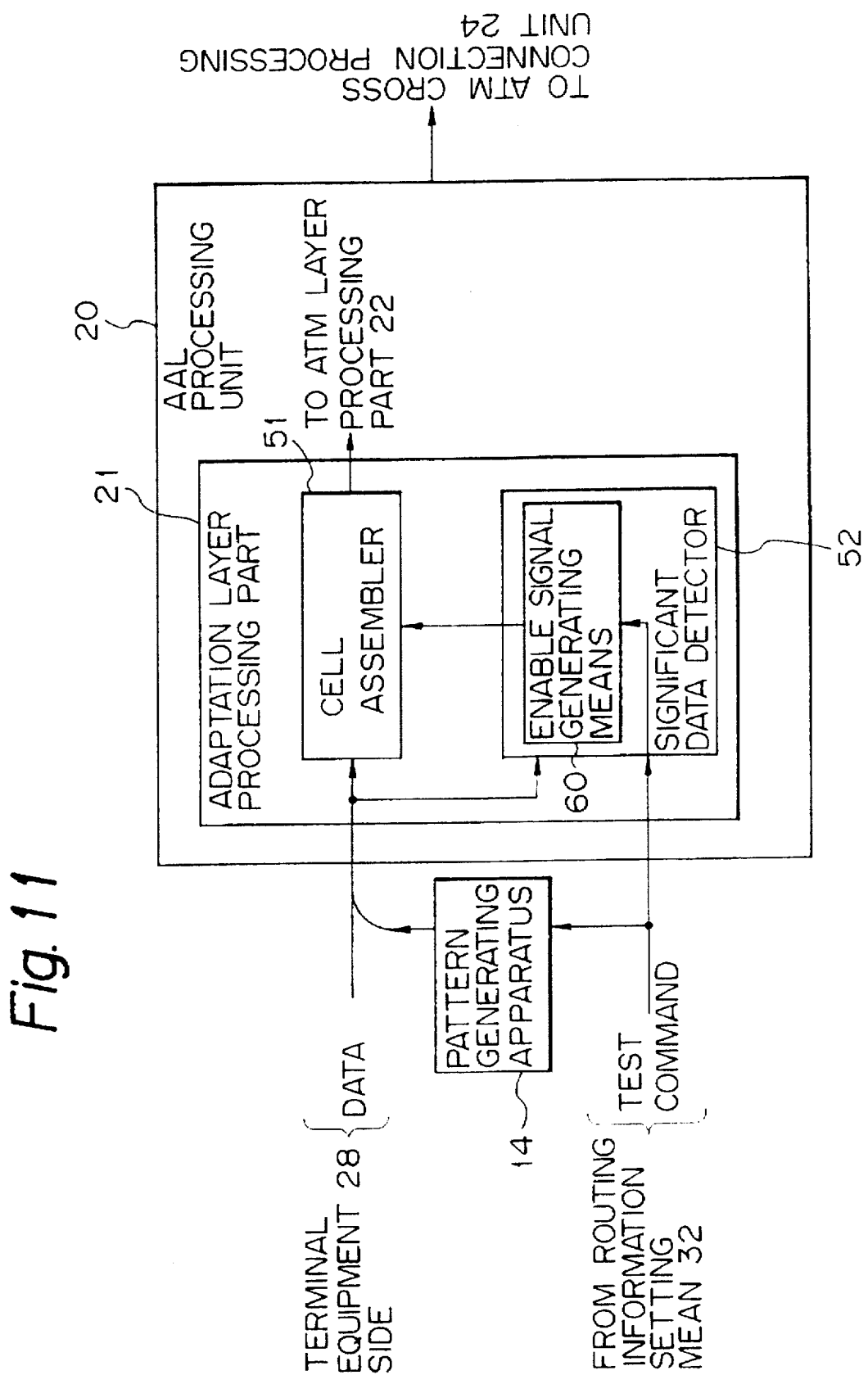
FIG. 11 is a block diagram of a more detailed example of the constitution of an AAL processing unit in FIG. 4.

FIG. 11 is a block diagram of a more detailed example of the constitution of an AAL processing unit 20 in FIG. 4. Provision is made, in the AAL processing unit 20, of an enable signal generating means 60 which is added to so as to cooperate with an existing significant data detector 52 provided for separating insignificant data and significant data in the data input from the terminal equipment 28 and provision is made of a pattern generating apparatus 14 which generates pattern signals and inputs them to the AAL processing unit 20 in place of the terminal equipment 28. During a test, the enable signal generating means 60 is not driven, the assembly of ATM cells in the AAL processing unit 20 is suspended, and the pattern signals are supplied as they are to the ATM cross connection processing unit 24. The assembly of ATM cells is performed in general by a cell assembler 51.

In general, only the portion of the significant data in the data input is detected by the significant data detector 52 and only the portion of the significant data is assembled into ATM cells by the cell assembler 51.

According to the present invention, when the above-mentioned test command (FIG. 5) is issued from the routing information setting means 32, the enable signal generating means 60 is deenergized and the assembly operation is suspended at the cell assembler 51 as well.

As a result, the pattern signals from the pattern generating apparatus 14 started by the test command are passed as they are through the cell assembler 51, go through the ATM layer processing part 22, and are input to the cross connection processing unit 24. The pattern signals mapped in the cell pilot preferably are supplied to the payload pattern generating apparatus 44 (FIG. 10).

A test using the pattern signals is primarily suited for inspecting if a bit error has occurred. Further, it may be used for measuring the error rate.

Figure 12:
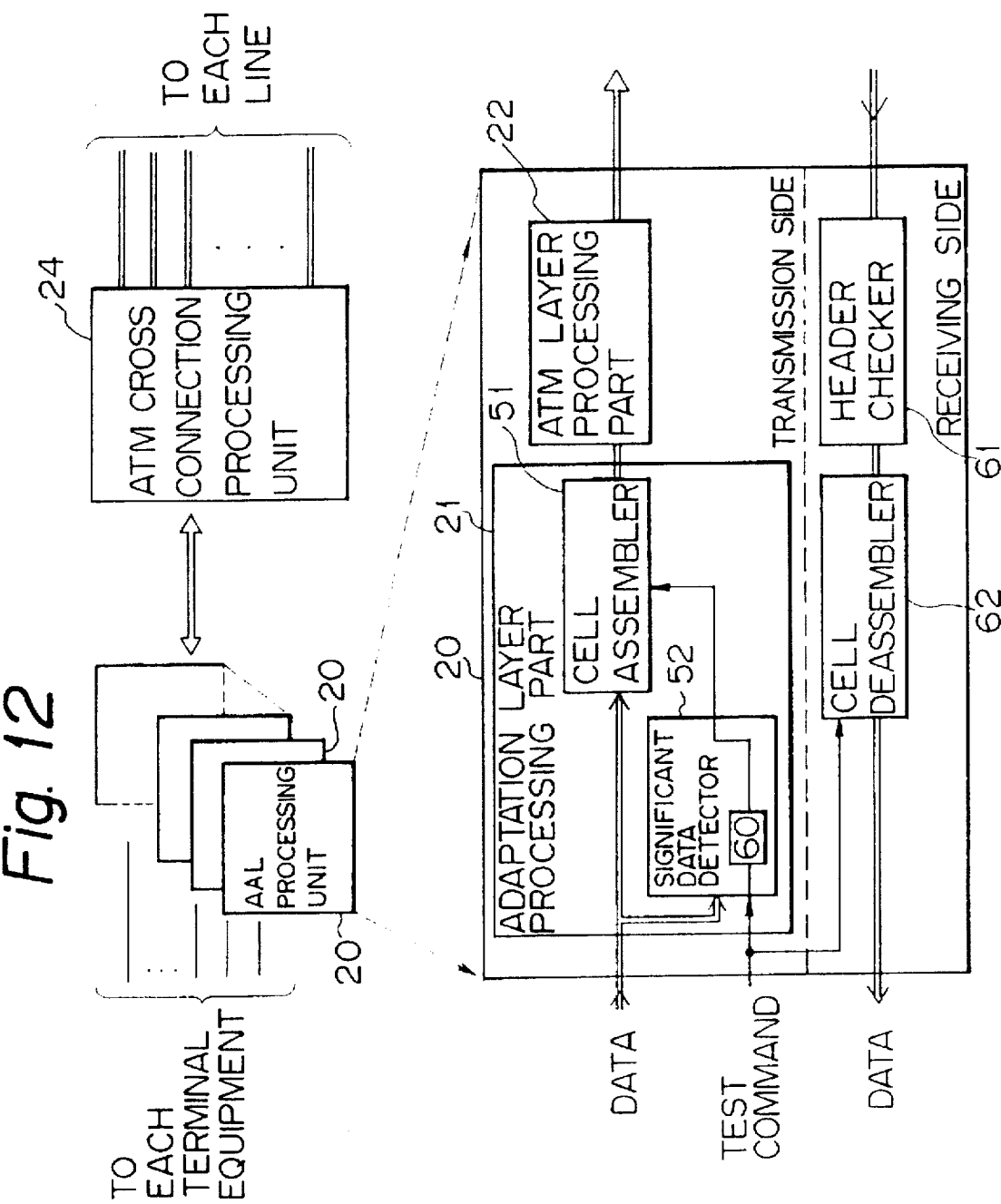
FIG. 12 is a view for explaining in more detail the constitution of the AAL processing unit.

FIG. 12 is a view for explaining in more detail the constitution of the AAL processing unit 20 and corresponds to the above-mentioned FIG. 6. However, the figure shows the constitution relating to an AAL processing unit having the function of converting just the MDLC protocol and other significant data (frame portion etc.) into cells in an ATM multiplex transmission system constructed by AAL processing units 20 and an ATM cross connection processing unit 24.

The AAL processing unit 20, as shown at the bottom in FIG. 12, is divided into a transmission side and a receiving side and is provided at the transmission side with an adaptation layer processing part 21 and an ATM layer processing part 22 for adding the ATM header. The adaptation layer processing part 21 is comprised of a detector 52 which detects the frame portion (data with flags at front and rear) to detect the presence of significant data and a cell assembler 51 which assembles the input data into cells when there is an enable signal from the means 60. At the reception side the unit is provided with a header checker 61 which checks the ATM header and a cell deassembler 62 for restoration of the received cells into the original data.

Next, an explanation will be made taking as an example the case where the AAL processing unit 20 is an AAL processing unit for MDLC data. In the AAL processing unit 20, when a test is performed using a pattern generating apparatus 14 (FIG. 11) of pseudo noise patterns etc. not having flags, the test command is supplied to the significant data detector 52. This results in an enable signal being forcibly issued to the cell assembler 51 and the detection processing output of the significant data by the significant data detector 52 being invalidated. Therefore, the cell assembler 51 continuously converts the data into cells and transmits all of the data train (bit train) issued from the pattern generating apparatus 14 without a frame structure, such as a code generator.

Note that the AAL processing unit 20 is defined in detail in the following recommendations of the CCITT, so will not be explained in detail here:

1) Draft Recommendation I.361—B-ISDN ATM layer specification.

2) Draft Recommendation I.362—B-ISDN ATM Adaptation Layer (AAL) function description.

3) Draft Recommendation I.363—B-ISDN ATM Adaptation Layer (AAL) specification

Next, an explanation will be made taking as an example the case where the AAL processing unit 20 is an AAL processing unit for digital audio signals. In the case of this example, the significant data detector is realized as a detection means of the silent portions.

Thus, the significant data detector 52 is comprised as a detection means for detecting continuous flags (F) in an AAL processing unit 20 for the high level data link control (HDLC) data or is comprised as a detection means for the silent portions in an AAL processing unit 20 for digital audio signals.

Figure 13A:
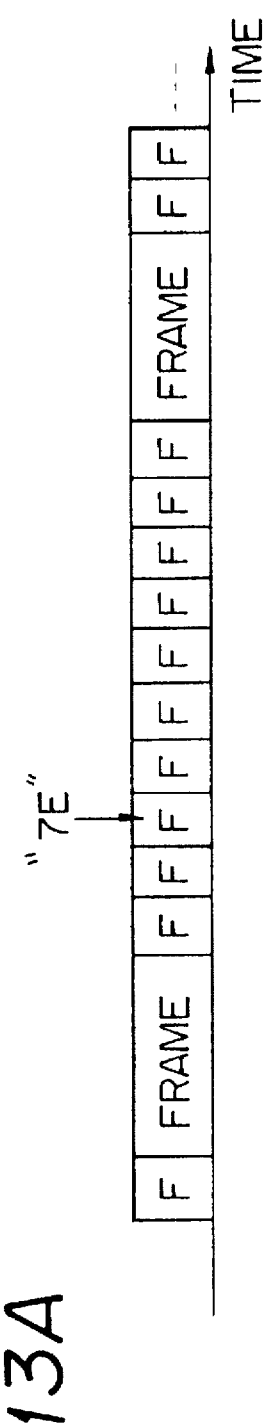
FIG. 13A is a view showing the continuous flags detected by a significant data detector for HDLC data.
Figure 13B:
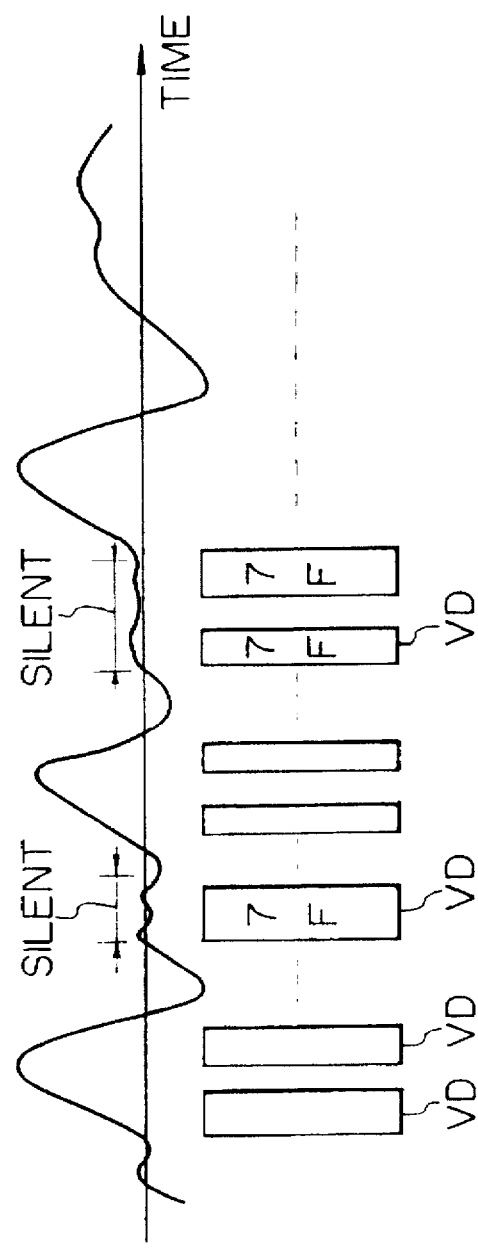
FIG. 13B is a view showing the silent portions detected by a significant data detector for digital audio signals.

FIG. 13A is a view showing the continuous flags detected by a significant data detector for HDLC data. FIG. 13B is a view showing the silent portions detected by a significant data detector for digital audio signals. In FIG. 13A, the flags F are normally expressed by "7E" in hexadecimal notation. In FIG. 13B, the original analog audio signals are converted to 8-bit digital audio signals VD by, for example, 8 kHs sampling, but the VD corresponding to the silent portions is normally expressed by "7F" in hexadecimal notation.

Figure 14:
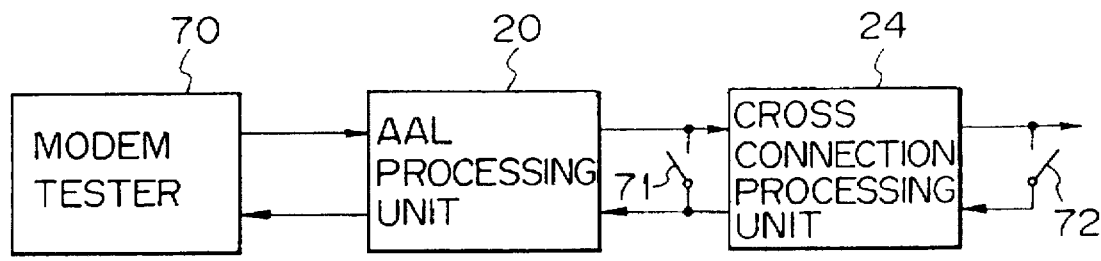
FIG. 14 is a view of a third test mode according to the present invention.

FIG. 14 is a view of a third test mode according to the present invention and corresponds to the above-mentioned FIG. 7A and FIG. 7B. The third test mode is particularly effective when using the test equipment shown in FIG. 11 and FIG. 12.

In FIG. 14, the newly appearing element is the modem tester 70.

Provision is made of a pattern measuring apparatus 15 in a call-receiving side line designated by the VPI and VCI, which pattern measuring apparatus 15 comprises the modem tester 70 integral with the pattern generating apparatus 14.

Further, provision is made, at the output side of the AAL processing unit 20 or the output side of the ATM cross connection processing unit 24, of a loopback unit which loops back the pattern signals to the modem tester 70 side. In the figure, the loopback unit corresponding to the former is shown by 71, while the loopback unit corresponding to the latter is shown by 72. When the switches are made on, the loopback is formed. When the loopback unit 72 is used, a loopback test on the ATM cross connection processing unit 24 may also be performed.

In an ATM multiplex transmission system comprised of AAL processing units 20 and an ATM cross connection processing unit 24, when an AAL processing unit 20 accommodates terminal equipment having a protocol such as HDLC and has a function of converting into cells just the significant information, if a test command is input, the processing for detecting the significant information is invalidated.

After this, a modem tester 70 equipped with the function of generating a test signal train like a PN pattern and of receiving a signal train and measuring the same is connected to the input side of the AAL processing unit 20 (side where terminal equipment is accommodated). When the test signal is input, ATM cell assembly is performed at the AAL processing unit 20 (in this case, the VPI/VCI of the cells are set in advance with respect to the AAL processing unit from the outside).

Figure 15:
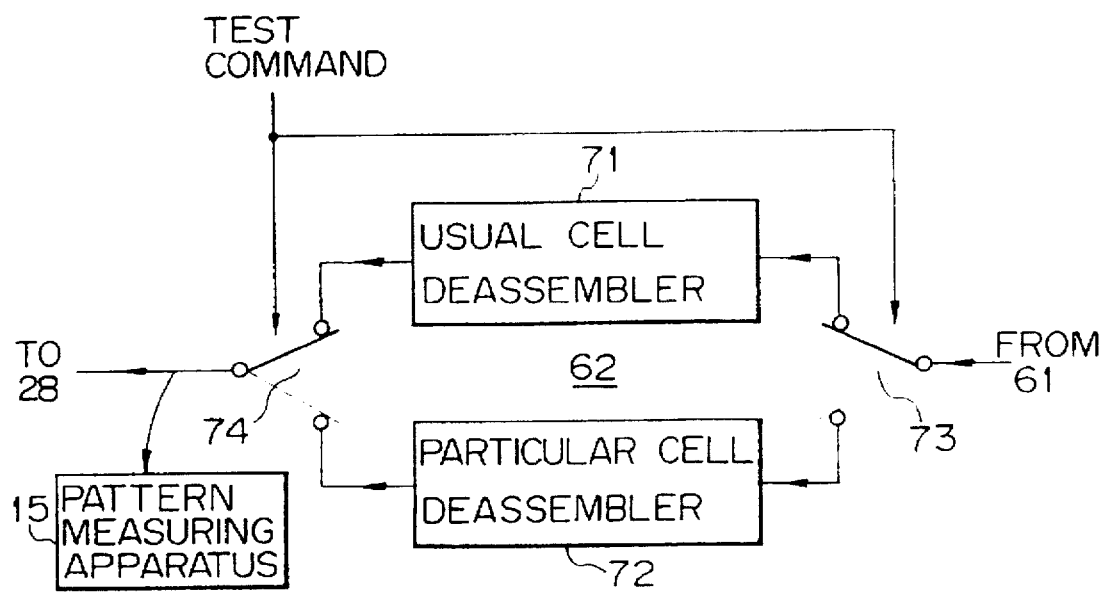
FIG. 15 is a view of the general constitution of a cell deassembler 62 based on the present invention.

FIG. 15 is a view of the general constitution of a cell deassembler 62 based on the present invention. This is comprised of a pair of a general usual cell deassembler 71 and a particular cell deassembler 72 and is switched selectively by cooperating switches 73 and 74. When a test command is issued, a test cell including the pattern signals is input, so the deassembler 72 for the test is used.

According to the present invention, it is possible to realize a routing test and an error rate test for different parts of an ATM multiplex transmission system with the same measuring apparatus used for the conventional STM systems—that is, without the use of measuring apparatuses exclusively for ATM use—at the stage where ATM systems are spreading.

What is claimed is:

1. An ATM multiplex transmission system connected to a plurality of input lines and output lines, for transmitting an ATM cell having a header for routing information, said routing information being written in said header as a virtual path identifier VPI and virtual channel identifier VCI, and a payload for a transmission data, comprising:

ATM adaptation layer (AAL) processing units for assembling data from terminal equipment to be transmitted as ATM cells, multiplexing the ATM cells and demultiplexing the multiplexed ATM cells transmitted to the terminal equipment and distributing the ATM cells to the terminal equipment;

an ATM cross connection processing unit which switches the multiplexed ATM cells from the AAL processing units to one of said output lines designated by the header, demultiplexes the multiplexed ATM cells from said input lines, and inputs the ATM cells to the AAL processing units, said cross connection processing unit having a plurality of line corresponding points provided in accordance with each of the input and output lines;

one of said plurality of line corresponding points including means for generating a test cell and routing information setting means connected to and cooperating with said test cell generating means to write routing information for designating a transmission route of said test cell in a header of the test cell, the line corresponding point including said test cell generating means and the routing information setting means being a test line corresponding point having an outgoing line and including:

a buffer which successfully and temporarily stores normal ATM cells output from an ATM cross connection in said ATM cross connection processing unit;

a selection switch which selects one of an output cell from said buffer or the test cell from the cell generating means; and a switching control part which monitors if said buffer has become empty and which, if detecting that said buffer has become empty, switches the selection switch to a side of the test cell generating means and transmits the output cell from the test cell generating means to the outgoing line connected to the test line corresponding point.

2. An ATM multiplex transmission system connected to a plurality of input lines and output lines, for transmitting an ATM cell having a header for routing information, said routing information being written in said header as a virtual path identifier VPI and virtual channel identifier VCI, and a payload for a transmission data, comprising:

ATM adaptation layer (AAL) processing units for assembling data from terminal equipment to be transmitted as ATM cells, multiplexing the ATM cells and demultiplexing the multiplexed ATM cells transmitted to the terminal equipment and distributing the ATM cells to the terminal equipment;

an ATM cross connection processing unit which switches the multiplexed ATM cells from the AAL processing units to one of said output lines designated by the header, demultiplexes the multiplexed ATM cells from said input lines, and inputs the ATM cells to the AAL processing units, said cross connection processing unit having a plurality of line corresponding points provided in accordance with each of the input and output lines;

one of said plurality of line corresponding points including means for generating a test cell and routing information setting means connected to and cooperating with said test cell generating means to write routing information for designating a transmission route of said test cell in a header of the test cell, in the ordinary transmission state other than at the time of execution of a test, said routing information is disabled and the VPI and the VCI are both made "0", said test cell generating means functioning as an empty cell generating unit in said ordinary transmission state and functioning to generate said test cell during said test.

3. An ATM multiplex transmission system connected to a plurality of input lines and output lines, for transmitting an ATM cell having a header for routing information, said routing information being written in said header as a virtual path identifier VPI and virtual channel identifier VCI, and a payload for a transmission data, comprising:

ATM adaptation layer processing units for assembling data from a terminal equipment to be transmitted as ATM cells, multiplexing the ATM cells and demultiplexing the multiplexed ATM cells transmitted to the terminal equipment and distributing the ATM cells to the terminal equipment;

an ATM cross connection processing unit which switches the multiplexed ATM cells from the AAL processing units to one of said output lines designated by the header, demultiplexes the multiplexed ATM cells from said input lines, and inputs the ATM cells to the AAL processing units, said cross connection processing unit having a plurality of line corresponding points provided in accordance with each of the input and output lines;

one of said plurality of line corresponding points including means for generating a test cell and routing information setting means connected to and cooperating with said test cell generating means to write routing information for designating a transmission route of said test cell in a header of the test cell, said test cell generating means includes:

flip-flops corresponding to a plurality of octets composing an ATM header portion of the ATM cell, said flip-flops having inputs for receiving said routing information and outputs;

data selectors which select bits of the octets from the outputs of said flip-flops and output word data;

counters which select the bit data in the data selectors in the order of the octets; and a multiplexer receiving at its inputs outputs from the data selectors, the flip-flops temporarily holding at least VPI's and VCI's which are designated as said routing information.

4. A system as set forth in claim 3, wherein one of the flip-flops is a header error control HEC flip-flop which temporarily holds HEC information, and further comprising a calculation means, the HEC flip-flop being connected to said calculation means which calculates in advance the HEC bits when said VPI and VCI are determined and supplies the results of calculations to the HEC flip-flop.

5. An ATM multiplex transmission system connected to a plurality of input lines and output lines, for transmitting an ATM cell having a header for routing information, said routing information being written in said header as a virtual path identifier VPI and virtual channel identifier VCI, and a payload for a transmission data, comprising:

ATM adaptation layer (AAL) processing units for assembling data from terminal equipment to be transmitted as ATM cells, multiplexing the ATM cells and demultiplexing the multiplexed ATM cells transmitted to the terminal equipment and distributing the ATM cells to the terminal equipment;

an ATM cross connection processing unit which switches the multiplexed ATM cells from the AAL processing units to one of said output lines designated by the header, demultiplexes the multiplexed ATM cells from said input lines, and inputs the ATM cells to the AAL processing units, said cross connection processing unit having a plurality of line corresponding points provided in accordance with each of the input and output lines;

one of said plurality of line corresponding points including means for generating a test cell and routing information setting means connected to and cooperating with said test cell generating means to write routing information for designating a transmission route of said test cell in a header of the test cell, each ATM adaptation layer (AAL) processing unit includes at a data input thereof an enable signal generating means providing signals for starting assembly of ATM/cells, which enable signal generating means is connected with an existing significant data detector in the AAL processing unit provided for separating input data received at said data input from the terminal equipment into significant data and insignificant data, significant data conveying information that is meaningful for subscribers, insignificant data containing no meaningful information for subscribers, and further comprising a pattern generating apparatus which generates pattern signals and inputs said pattern signals to the AAL processing unit in place of the data of the terminal equipment when a test is to be conducted for a diagnosis of the ATM multiplex transmission system, and wherein during the test, the enable signal generating means is not driven so as to suspend the assembly of ATM cells in the AAL processing unit, and the pattern signals are supplied to the ATM cross connection processing unit.

6. A system as set forth in claim 5, and further comprising a pattern measuring apparatus in a call-receiving side line designated by said VPI and VCI, said pattern measuring apparatus including a modem tester integral with said pattern generating apparatus.

7. A system as set forth in claim 6, and further comprising a loopback unit provided at an output side of one of the AAL processing unit and the ATM cross connection processing unit, said loopback unit looping back the pattern signals to a modem tester side.

8. A system as set forth in claim 5, wherein said pattern signals are pseudo noise (PN) pattern signals.

9. A system as set forth in claim 5, wherein said significant data detector includes a detection means for detecting continuous flags in an AAL processing unit for the high level data link control HDLC data.

10. A system as set forth in claim 5, wherein said existing significant data detector includes a detection means for detecting silent portions in an AAL processing unit for digital audio signals.

11. An ATM multiplex transmission system connected to a plurality of input lines and output lines, for transmitting an ATM cell having a header for routing information and a payload for a transmission data, comprising:

ATM adaptation layer (AAL) processing units for assembling data from terminal equipment to be transmitted as ATM cells, multiplexing the ATM cells and demultiplexing the multiplexed ATM cells transmitted to the terminal equipment and distributing the ATM cells to the terminal equipment;

an ATM cross connection processing unit which switches the multiplexed ATM cells from the AAL processing units to one of said output lines designated by the header, demultiplexes the multiplexed ATM cells from said input lines, and inputs the ATM cells to the AAL processing units, said cross connection processing unit having a plurality of line corresponding points provided in accordance with each of the input and output lines;

one of said plurality of line corresponding points including means for generating a test cell and routing information setting means connected to and cooperating with said test cell generating means to write routing information for designating a transmission route of said test cell in a header of the test cell, wherein for performing the routing test an outgoing line connected to a test line corresponding point including said test cell generating means and said routing information setting means, in the plurality of line corresponding points, is connected to another incoming line of said ATM cross connection processing unit, and wherein an outgoing line connected to a test line corresponding point including said test cell generating means and said routing information setting means, in the plurality of line corresponding points, is connected to a line corresponding point, at its incoming line, in another ATM cross connection processing unit, and the routing test is performed in the other ATM cross connection processing unit.

12. A system as set forth in claim 11, wherein said routing information is written as a virtual path identifier VPI and virtual channel identifier VCI in the header of the ATM cell.

13. A system as set forth in claim 4, wherein whether said test cell is correctly distributed in accordance with the routing information is judged using a traffic monitor and a control unit, an existing constituent element in the ATM cross connection processing unit.

14. A system as set forth in claim 11, wherein whether said test cell supplied from the test line corresponding point is correctly distributed in accordance with the routing information is judged using a traffic monitor and a control unit, an existing constituent element in the ATM cross connection processing unit.

* * * * *